United States Patent [19]

Edgington

[11] 4,352,450

[45] Oct. 5, 1982

[54] METHOD FOR SOLDERING ALUMINUM

[76] Inventor: Robert E. Edgington, 120 S. Genesse, Bellaire, Mich. 49615

[21] Appl. No.: 188,699

[22] Filed: Sep. 19, 1980

[51] Int. Cl.³ .............................. B23K 1/02; B23K 1/20
[52] U.S. Cl. ..................................... 228/205; 228/208; 228/225; 228/256; 228/263 F
[58] Field of Search ............... 228/205, 225, 208, 238, 228/256, 263 F; 75/134 B, 178 AT, 178 AN, 178 CT, 178 TL

[56] References Cited

U.S. PATENT DOCUMENTS

| | | | |
|---|---|---|---|
| 585,551 | 6/1897 | Broadwell | 75/134 B |
| 1,233,803 | 7/1917 | Overend | 228/208 X |
| 1,333,237 | 3/1920 | Ayala | 75/134 B |
| 1,926,854 | 9/1933 | Callis et al. | 75/134 B |
| 3,063,145 | 11/1962 | Bouton | 228/263 F X |
| 3,711,628 | 1/1973 | Hansson | 228/263 F X |
| 3,733,687 | 5/1973 | Tanaka et al. | 228/263 F |
| 3,744,121 | 7/1973 | Nagano et al. | 228/263 F X |
| 3,855,679 | 12/1974 | Schmatz | 228/209 X |

FOREIGN PATENT DOCUMENTS 629425  9/1949  United Kingdom .......... 75/178 AT

*Primary Examiner*—Kenneth J. Ramsey

*Attorney, Agent, or Firm*—John C. Purdue

[57] ABSTRACT

A method for soldering aluminum or aluminum alloys is disclosed, together with an alloy useful in the method. The method includes heating, for example by using a torch, at least one aluminum piece to a temperature within the range of 90–150 degrees celsius, cleaning at least one heated surface thereof, for example by wire brushing, further heating the cleaned piece to a temperature within the range of 350–490 degrees celsius, and applying, for example by rub soldering, to the cleaned and further-heated piece a quantity sufficient to enable subsequent soldering, as required, of a tin/lead/zinc alloy consisting essentially of, by weight, from 1.7 to 2.2 percent aluminum, from 0.01 to 0.02 percent magnesium, from 45.9 to 50.4 percent zinc, from 14.2 to 34 percent tin, and from 16.6 to 36.7 percent lead. A surface of the alloy so applied is then cleaned, for example by wire brushing; the aluminum piece is cooled to a soldering temperature and the alloy surface is soldered, for example by rub soldering, with a suitable lead-tin solder. According to the invention, single pieces of aluminum or aluminum alloy can be repaired, or a plurality of such pieces can be joined by intimately contacting soldered surfaces thereof and further heating to provide a repair or solder joint of high tensile strength.

5 Claims, No Drawings

METHOD FOR SOLDERING ALUMINUM

BACKGROUND OF THE INVENTION

1. Field of the Invention

This invention relates to a method for soldering aluminum or aluminum alloys, and also to a solder useful in such a method. Aluminum metals are well known to be difficult to solder or braze because they develop an oxide surface film which is difficult to remove or penetrate. Various soldering fluxes have been suggested to overcome this difficulty in conjunction with such methods as ultrasonic soldering, rub soldering and the like.

Alloys which are reported to have been somewhat successful in use as aluminum solders are relatively high-melting point, good tensile strength zinc alloys containing such metals as aluminum, copper, nickel, magnesium, and chromium, and lower-melting solders largely composed of tin and/or cadmium, and which contain lower amounts of zinc, usually in the range of 10–30 percent.

While there are numerous suggestions of the use of various soldering fluxes to enable a solder to wet an aluminum surface and subsequent use of the same or a different solder, the methods proposed have not made the soldering of aluminum and its alloys a chore which can be performed by the usual handyman or hobbyist. It has now been found that these materials can be soldered quickly and economically by first preparing a surface to be soldered with a zinc/lead/tin alloy and then applying a conventional lead-tin solder to the prepared surface.

2. Description of the Prior Art

Numerous prior art references have disclosed the use of zinc alloys for soldering or brazing aluminum or aluminum alloys. For example, U.S. Pat. No. 1,233,803 discloses the use of a tin-zinc alloy followed by a tin-cadmium alloy; stearic acid is used as an essential flux (not mixed with another material). The steps of the process disclosed in this patent involve (1) heating the aluminum metal to be soldered; (2) applying the flux; (3) applying the Sn-Zn alloy; (4) further heating; (5) rubbing the molten alloy with a tool; (6) reheating or continuing the prior heating; and (7) applying the second alloy (Sn-Cd).

U.S. Pat. No. 3,733,687 discloses a solder alloy containing 0.5–4.5 percent by weight aluminum, 0.1–4.0 percent by weight copper, 0.005–0.08 percent by weight magnesium, 0.0–0.5 percent by weight nickel, and 0.0–0.5 percent by weight chromium, balance zinc. This reference describes the alloy disclosed therein as suitable for soldering aluminum to aluminum or to other metals such as copper, brass or iron.

U.S. Pat. No. 3,855,679 describes a two-step soldering method for aluminum involving the use, first, of a lead-/tin/silver/antimony solder, and, second, of a lead/tin solder.

DEFINITIONS

As used herein and in the appended claims:

The term "aluminum" refers to both aluminum and aluminum alloys. Such alloys include but are not limited to three commonly in use: aluminum alloyed with (1) 6.25 percent tin, 1 percent nickel, and 1 percent copper; (2) 1 to 3 percent cadmium with varying amounts of silicon, copper, and nickel; and (3) 20 to 30 percent tin and up to 3 percent copper.

All temperatures are expressed in degrees celsius.

The terms "percent" and "parts" refer to percent and parts by weight unless otherwise indicated.

BRIEF DESCRIPTION OF THE INVENTION

It has now been discovered that problems associated with prior art methods for soldering aluminum can be overcome by the use of a tin/lead/zinc alloy properly applied to aluminum as part of a novel method for soldering such material. The instant invention is based upon this discovery as a step of a method for soldering aluminum which includes a subsequent soldering step with a conventional lead-tin solder, and upon the discovery of a tin/lead/zinc alloy useful in the method. It has been found that the invention enables the unexpectedly advantageous result of a soldered region which is of high tensile strength. The necessity for additional solder constituents such as copper, nickel, and chromium is eliminated, and precious or expensive metals such as silver and antimony are not needed to prepare an aluminum surface for subsequent soldering.

Accordingly, it is an object of this invention to provide an improved method for soldering aluminum.

It is a further object of this invention to provide an improved alloy useful in a method for soldering aluminum.

Other objects and advantages will be apparent from the following detailed description, which is intended only to illustrate and disclose but in no way to limit the invention as defined in the claims appended hereto.

DETAILED DESCRIPTION OF THE INVENTION

This invention relates to an improved method useful for soldering aluminum with lead-tin solder, thereby eliminating the need to use special or expensive solders, or solders containing, for example, copper, nickel, or chromium. The invention also relates to an improved tin/lead/zinc alloy which, when used in the method of the present invention prior to application of a suitable lead-tin solder, enables the unexpectedly advantageous result of a final aluminum-to-aluminum bond of high tensile strength. This result is achieved expeditiously and inexpensively.

The instant invention provides a method for soldering aluminum which includes the following steps:

(1) Heating at least one aluminum piece to a temperature within the range of 90–150 degrees;

(2) cleaning a surface of at least one heated piece, for example by wire brushing;

(3) further heating the cleaned surface to a temperature within the range of 350–490 degrees;

(4) applying to the cleaned and further-heated surface a quantity, sufficient to enable subsequent soldering, as required, of a tin/lead/zinc alloy consisting essentially of from 1.7 to 2.2 percent aluminum, from 0.01 to 0.02 percent magnesium, from 45.9 to 50.4 percent zinc, from 14.2 to 34.0 percent tin, and from 16.6 to 36.7 percent lead;

(5) cleaning a surface of the applied alloy, for example by wire brushing;

(6) cooling the piece to an appropriate soldering temperature for a lead-tin solder, i.e. within the range of approximately 180–300 degrees; and (7) soldering the cleaned alloy surface with a suitable lead-tin solder, preferably by rub soldering with a solder consisting of substantially 50 percent lead and 50 percent tin.

Two or more aluminum pieces can be maintained in intimate contact and soldered according to the invention to form therebetween a solder joint of high tensile strength.

The method of the instant invention, and a preferred composition of the alloy thereof as described above, are described in the following Example, which is intended only to illustrate and disclose and in no way to limit the invention as defined in the claims appended hereto.

EXAMPLE

The procedure described below, which constitutes the best presently known mode, was used to solder together two pieces of conventional solid aluminum bar stock (100% Al except for minor impurities), each 3½ inches in length, 2 inches in width, and 0.082 inch in thickness.

The aluminum pieces were cleaned using a strong commercial detergent to remove any surface oil or grease present. The detergent used is commercially available under the designation "Shaklee Basic I." Each piece was then placed in a bench vise, heated to about 95 degrees by direct application of flame from a propane torch, and cleaned with a wire brush for about 1 minute. The temperature of each piece was maintained at approximately 95 degrees during cleaning. Following wire brushing, each piece was further heated, using the propane torch, to a temperature of approximately 375 degrees. A tin/lead/zinc alloy composed of 2 percent aluminum, 0.02 percent magnesium, 47.8 percent zinc, 25 percent lead, and 25 percent tin, was then rub soldered onto a surface about ½ inch by 2 inches at one end of each piece. Rub soldering of the alloy was continued until a thin film thereof completely covered the indicated portion of the surface. In order to avoid loss of the alloy care was taken at all times during application to assure that it was not directly exposed to the flame of the torch.

The alloy surfaces on the aluminum stock, following application thereof as described above, were then cleaned by wire-brushing for approximately 1 minute, after which each piece was allowed to cool to a temperature of about 280 degrees. A thin film of a lead-tin solder composed of substantially 50 percent lead and 50 percent tin was then applied to the alloy surface of each piece by rub soldering. The solder-carrying surfaces of the pieces were then brought together and clamped in intimate contact with a conventional C-clamp. Heat from a propane torch was then applied until the lead-tin solder was observed to re-liquefy and ooze from between the contacting surfaces. At this point heating was discontinued and the assembly, consisting of the two soldered aluminum pieces held together by the C-clamp, was allowed to cool to room temperature (approximately 22 degrees).

After the assembly had cooled, the C-clamp was removed. The solder joint between the pieces was found to be about 0.020 inch thick. The tensile strength of the joint was found to be 18,300 psi.

The tin/lead/zinc alloy of the instant invention, as described in the above example, is useful both in the method of the instant invention and in other methods of soldering aluminum and aluminum alloys known to those skilled in the art. The alloy was produced by melting and mixing together equal parts of a zinc alloy composed of 4 percent Al and 0.04 percent Mg, balance zinc, and a lead-tin solder composed of 50 percent lead and 50 percent tin. An alloy according to the invention and suitable for use in the method thereof can also be produced by mixing 100 parts of a zinc alloy consisting essentially of from 3.5 to 4.2 percent Al, and from 0.030 to 0.045 percent Mg, balance zinc, with from 90 to 110 parts of a lead-tin solder consisting essentially of from 30 to 65 percent tin, balance lead.

A zinc alloy suitable and preferred for use as a constituent of the tin/lead/zinc alloy of the instant invention is, for example, "No. 3 zinc alloy", commercially available from Grand Rapids Alloys, Inc., Grand Rapids, Mich., which is usually supplied in the form of a wire or a cast bar. Other compositions having proportions of aluminum, magnesium, and zinc within the above-stated ranges are suitable for use in producing the alloy for practicing the method of the instant invention.

The lead-tin solder used as a constituent in the tin/lead/zinc alloy of the present invention can be any commercially available binary lead-tin solder with proportions of constituents within the ranges of 30 to 65 percent tin, balance lead. Preferably, this solder should consist essentially of substantially 50 percent tin and 50 percent lead. This lead-tin solder can be alloyed with the zinc alloy described above to produce the tin/lead/zinc alloy of the invention by using any conventional method; for example, metallurgical techniques commonly used by those skilled in the art of manufacturing alloys. The techniques which can be used, if desired, include the steps of melting both the solid zinc alloy and lead-tin solder, mixing these constituents, and then casting the mixture into a suitable and convenient shape, such as a solid bar, to facilitate subsequent rub soldering of this material onto the surface of a workpiece. It has been found that the zinc alloy and the lead-tin solder, when melted, are readily miscible, and therefore quickly and easily form the lead/tin/zinc alloy of the present invention.

It will be appreciated that the method as described and illustrated in the foregoing Example, while representing the best mode, illustrates only one embodiment of the instant invention. For example, the method of the Example has been used to solder aluminum alloys and to repair fissures and cracks in aluminum and aluminum alloy pieces, including sheet and bar stock and such objects as boats, rafts and aircraft.

It is important that soldering according to the invention be performed on aluminum pieces which are substantially free of extraneous matter such as, for example, oil or grease. Accordingly, prior to the initial heating, a piece to be soldered should be cleaned, for example with a commercially-available detergent or solvent, to remove as completely as possible surface impurities which could impede aluminum-solder bonding and as a consequence weaken the final joint or repair.

A thin film of the tin/lead/zinc alloy is applied by melting a quantity thereof, for example by rub-soldering, on and over the entire surface to be repaired or joined with another such surface; a thin film of this alloy is sufficient to enable subsequent lead-tin soldering provided the film covers the entire surface area to be soldered. The specific rub-soldering process by which the alloy is advantageously applied is commonly known in the art as "tinning"; it will be appreciated, however, that numerous additional ways and variations of ways for applying this alloy are possible, such as the use of ultrasonic soldering techniques.

Although it has been found that any conventional binary lead-tin solder is suitable for use as a final solder in the method of the present invention, a preferred solder is that commonly referred to as 50/50 solid solder (substantially 50 percent Pb and 50 percent Sn). Other possible compositions are, for example, substantially 67 percent Pb, 33 percent Sn (commonly known as "plumber's solder"), and the eutectic composition—37 percent Pb, 63 percent Sn. All of these solders require soldering temperatures within the range of approximately 180-300 degrees. Accordingly, whatever solder is used, the aluminum piece should be cooled to an appropriate temperature within this range prior to application of a solder which melts at the selected temperature.

The final lead-tin solder can be applied most easily and rapidly if it is in solid bar or wire form prior to being rubbed and melted onto the work piece; it is most advantageously supplied as solid extruded wire which can be applied, for example, by rub soldering to the cleaned tin/lead/zinc alloy surface. Other suitable soldering processes known to those skilled in the art are also feasible for use so long as a sufficient quantity of the solder is applied to the surface by the particular process selected to provide the desired tensile strength for the soldered repair or joint.

It has been found that unsatisfactory results are obtained when lead-tin solders including a flux are used; therefore, these types of solders are not desirable for use in the alloy or method of the instant invention.

Any number of procedures or variations of procedures for achieving the objects and advantages of the instant invention are possible. The foregoing disclosure, including the preceding Example, is not intended to limit the invention except as defined in the following claims.

What I claim is:

1. A method for soldering aluminum which includes the steps of heating at least one aluminum piece to a temperature within the range of 90°–150° C. cleaning at least one heated surface thereof, further heating the cleaned piece to a temperature within the range of 350°–490° C., applying to the cleaned and further-heated piece a coating, of a tin/lead/zinc alloy consisting essentially of from 1.7 to 2.2 percent aluminum, from 0.01 to 0.02 percent magnesium, from 45.9 to 50.4 percent zinc, from 14.2 to 34.0 percent tin, and from 16.6 to 36.7 percent lead, cleaning a surface of the applied alloy, cooling the coated piece to within the range of approximately 180°–300° C., and soldering the cleaned alloy surface with a lead-tin solder.

2. The method of claim 1 wherein the aluminum piece is composed of an aluminum alloy.

3. The method of claim 1 wherein at least 2 aluminum pieces are soldered.

4. The method of claim 3 wherein the applied alloy surfaces of the aluminum pieces are maintained in intimate contact during soldering with the lead-tin solder.

5. The method of claim 3 wherein the aluminum pieces are heated to a soldering temperature during the lead-tin soldering.

* * * * *